US012200527B2

United States Patent
Fujishiro et al.

(10) Patent No.: US 12,200,527 B2
(45) Date of Patent: Jan. 14, 2025

(54) RADIO MEASUREMENT COLLECTION METHOD AND USER EQUIPMENT

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 370 days.

(21) Appl. No.: 17/456,627

(22) Filed: Nov. 26, 2021

(65) Prior Publication Data

US 2022/0086673 A1 Mar. 17, 2022

Related U.S. Application Data

(63) Continuation of application No. PCT/JP2020/020013, filed on May 20, 2020.

(60) Provisional application No. 62/853,829, filed on May 29, 2019.

(51) Int. Cl.
*H04W 24/10* (2009.01)
*H04W 24/08* (2009.01)
*H04W 64/00* (2009.01)

(52) U.S. Cl.
CPC .......... *H04W 24/10* (2013.01); *H04W 24/08* (2013.01); *H04W 64/00* (2013.01)

(58) Field of Classification Search
None
See application file for complete search history.

(56) References Cited

U.S. PATENT DOCUMENTS

| 2016/0330644 | A1* | 11/2016 | Li | H04W 4/06 |
| 2017/0013570 | A1* | 1/2017 | Vajapeyam | H04W 74/0833 |
| 2017/0245158 | A1* | 8/2017 | Xiao | H04L 1/08 |
| 2017/0374574 | A1* | 12/2017 | Lee | H04W 24/08 |
| 2019/0239170 | A1* | 8/2019 | Thangarasa | H04W 52/365 |
| 2022/0345924 | A1* | 10/2022 | Hong | H04W 24/08 |

FOREIGN PATENT DOCUMENTS

| WO | 2018/142347 A1 | 8/2018 |
| WO | 2018/174804 A1 | 9/2018 |

OTHER PUBLICATIONS

Qualcomm Incorporated, "RACH report enhancements of SON," 3GPP TSG-RAN WG2 Meeting #104, R2-1817908, Nov. 12-16, 2018, total 5 pages, Spokane, USA.

Huawei, Hisilicon; "Considerations on out of coverage enhancements"; 3GPP TSG-RAN WG2 Meeting #106; R2-1907710; May 13-17, 2019; total 4 pages; Reno, Nevada.

* cited by examiner

*Primary Examiner* — Marcus Smith
(74) *Attorney, Agent, or Firm* — Studebaker & Brackett PC (57) ABSTRACT

A radio measurement collection method is a method performed by a user equipment in a mobile communication system in which, in addition to a normal coverage, different enhanced coverages are formed for respective coverage enhancement levels. The radio measurement collection method includes storing, based on an enhanced coverage of the different enhanced coverages in which the user equipment is located, a measurement log including measurement information regarding a radio environment for the user equipment and position information regarding the user equipment, and transmitting, to a network, the measurement log stored.

3 Claims, 8 Drawing Sheets

RADIO MEASUREMENT COLLECTION METHOD AND USER EQUIPMENT

RELATED APPLICATIONS

The present application is a continuation based on PCT Application No. PCT/JP2020/020013, filed on May 20, 2020, which claims the benefit of US Provisional Patent Application No. 62/853,829 filed on May 29, 2019. The content of which is incorporated by reference herein in their entirety.

The present disclosure relates to a radio measurement collection method used for a mobile communication system and a user equipment used in a mobile communication system.

BACKGROUND ART

In the Third Generation Partnership Project (3GPP), which is a standardization project for cellular communication systems, a function for Minimization of Drive Tests (MDTs) has been specified. With the MDT function, a user equipment measures a radio environment and reports measurement information regarding the radio environment to a network along with position information regarding the user equipment, thus enabling detection of, for example, coverage holes and the like to achieve optimization of the network and the like.

On the other hand, a user equipment is known that is intended for Machine Type Communication (MTC) and Internet of Things (IoT) services. Such user equipment is limited in transmission and/or reception bandwidth to achieve reduced cost, enhanced coverage, and reduced power consumption. Such user equipment employs coverage enhancement functions including repetition transmission (repetition) and the like such that the user equipment can also be used in poor radio environments.

In a case where the MDT function is applied to a user equipment to which the coverage enhancement function is applied, a new mechanism is considered to be needed which is not included in the known MDT function.

SUMMARY

A radio measurement collection method according to a first aspect is a method performed by a user equipment in a mobile communication system in which, in addition to a normal coverage, different enhanced coverages are formed for respective coverage enhancement levels. The radio measurement collection method includes storing, based on an enhanced coverage of the different enhanced coverages in which the user equipment is located, a measurement log including measurement information regarding a radio environment for the user equipment and position information regarding the user equipment, and transmitting, to a network, the measurement log stored.

A user equipment according to a second aspect is an equipment used in a mobile communication system in which, in addition to a normal coverage, different enhanced coverages are formed for respective coverage enhancement levels. The user equipment includes a controller configured to store, based on an enhanced coverage of the different enhanced coverages in which the user equipment is located, a measurement log including measurement information regarding a radio environment for the user equipment and position information regarding the user equipment, and a transmitter configured to transmit, to a network, the measurement log stored.

DESCRIPTION OF EMBODIMENTS

A mobile communication system according to an embodiment will be described with reference to the drawings. In the description of the drawings, the same or similar parts are designated with the same or similar reference signs.

Mobile Communication System

First, a configuration of a mobile communication system according to an embodiment will be described. Although the mobile communication system according to the embodiment is a 5G system of 3GPP, LTE may be at least partially applied to the mobile communication system.

Figure 1:
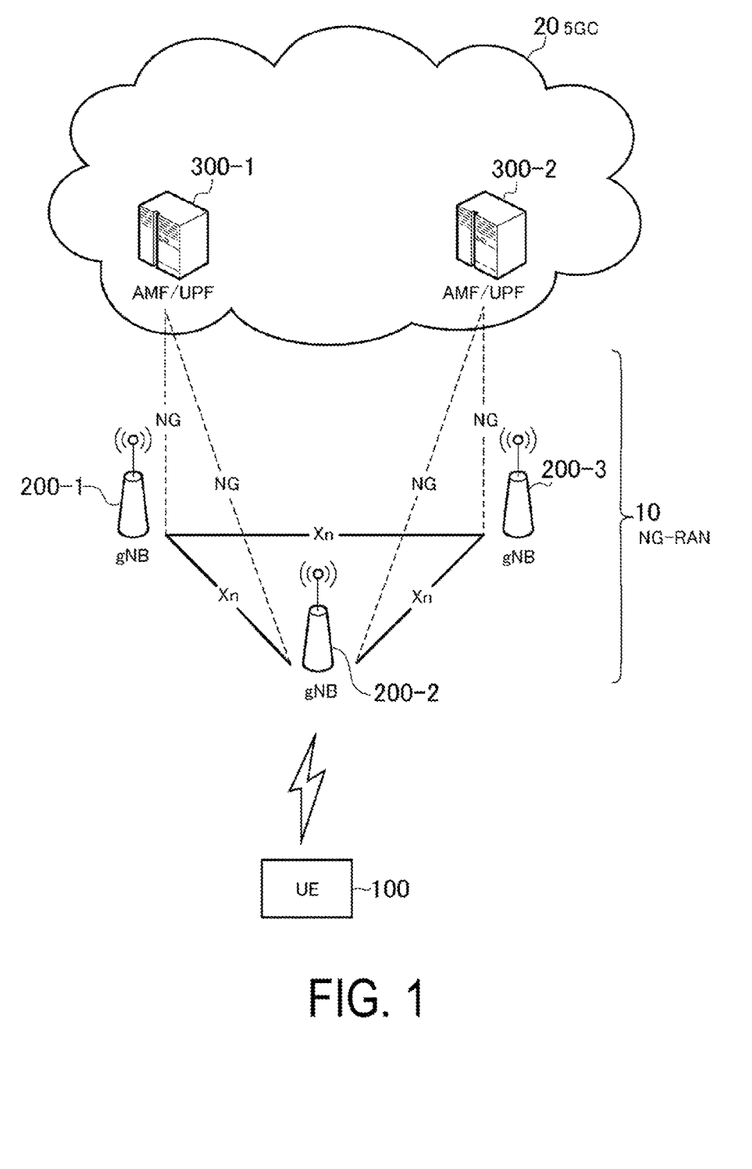
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a User Equipment (UE) 100, a 5G radio access network (Next Generation Radio Access Network (NG-RAN)) 10, and a 5G core network (5GC) 20.

The UE 100 is a movable apparatus. The UE 100 may be any apparatus so long as it is an apparatus utilized by a user. Examples of the UE 100 include a mobile phone terminal (including a smartphone), a tablet terminal, a laptop, a communication module (including a communication card or a chipset), a sensor or an apparatus provided in a sensor, a vehicle or an apparatus provided in a vehicle (vehicle UE), or an air vehicle or an apparatus provided in an air vehicle (aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base-station interface. The gNB 200 manages one or more cells. The gNB 200 performs radio communication with the UE 100 that has established connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource that performs radio communication with the UE 100. One cell belongs to one carrier frequency.

Note that a gNB may be connected to an Evolved Packet Core (EPC) which is an LTE core network, or an LTE base station may be connected to a 5GC. The LTE base station may be connected to the gNB via the inter-base-station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
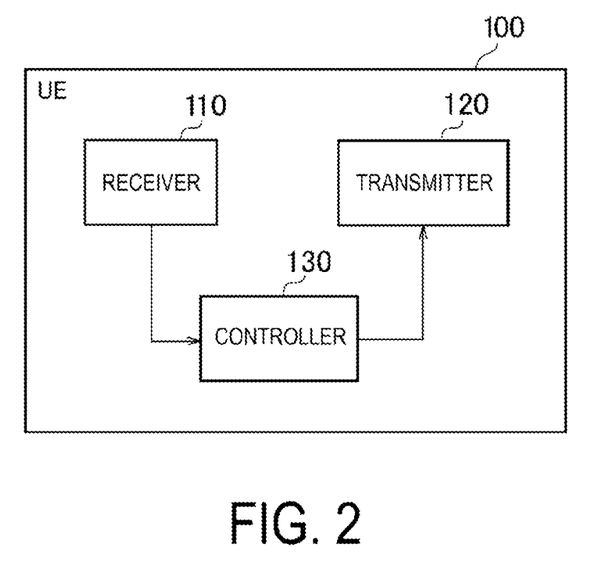
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various types of transmission under control of the controller 130. The transmitter 120 includes the antenna and a transmitting unit. The transmitting unit converts the baseband signal (transmission signal) to be output by the controller 130 into a radio signal and transmits the signal from the antenna.

The controller 130 performs various types of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of processing.

Figure 3:
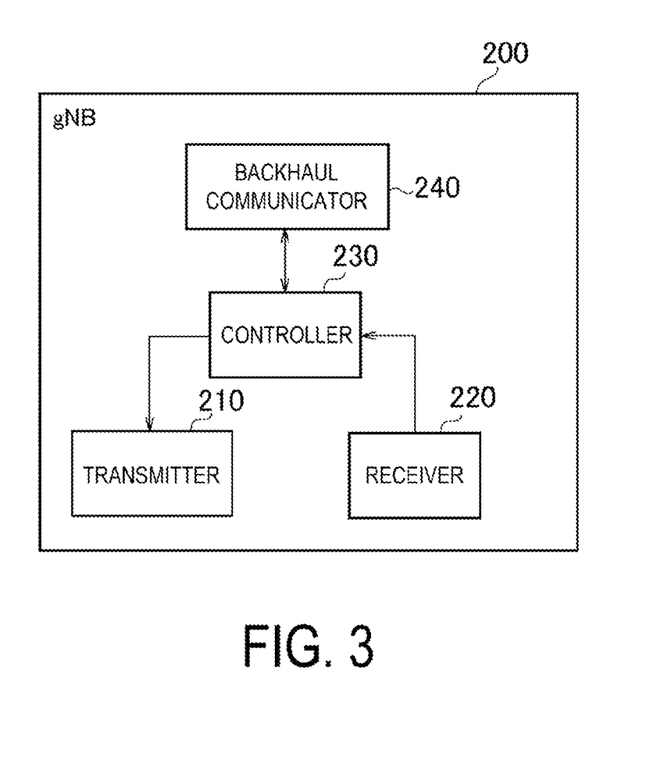
FIG. 3 is a diagram illustrating a configuration of a base station according to an embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) to be output by the controller 230 into a radio signal and transmits the signal from the antenna.

The receiver 220 performs various types of reception under control of the controller 230. The receiver 220 includes an antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of processing.

The backhaul communicator 240 is connected to a neighboring base station via the inter-base-station interface. The backhaul communicator 240 is connected to the AMF/UPF 300 via the base station to core network interface. Note that the gNBs may include a Central Unit (CU) and a Distributed Unit (DU) (i.e., may be functionally divided), and both units may be connected to each other via an F1 interface.

Figure 4:
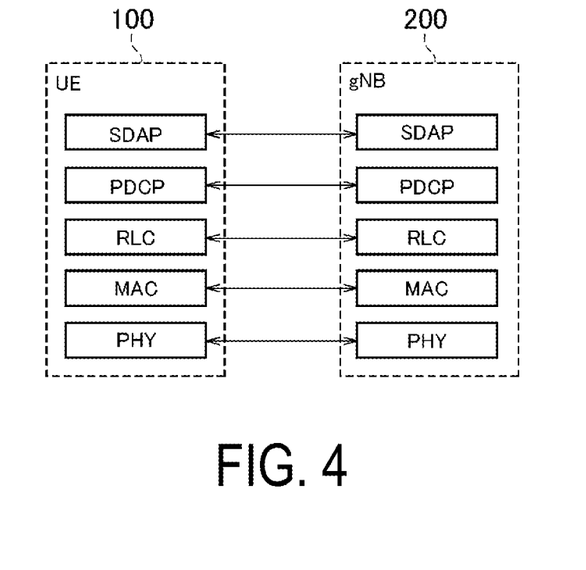
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by a hybrid ARQ (HARQ), random access procedure, and the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit of QoS control performed by the core network and a radio bearer that is a unit of QoS control performed by an Access Stratum (AS). Note that in a case where a RAN is connected to the EPC, the SDAP need not be provided.

Figure 5:
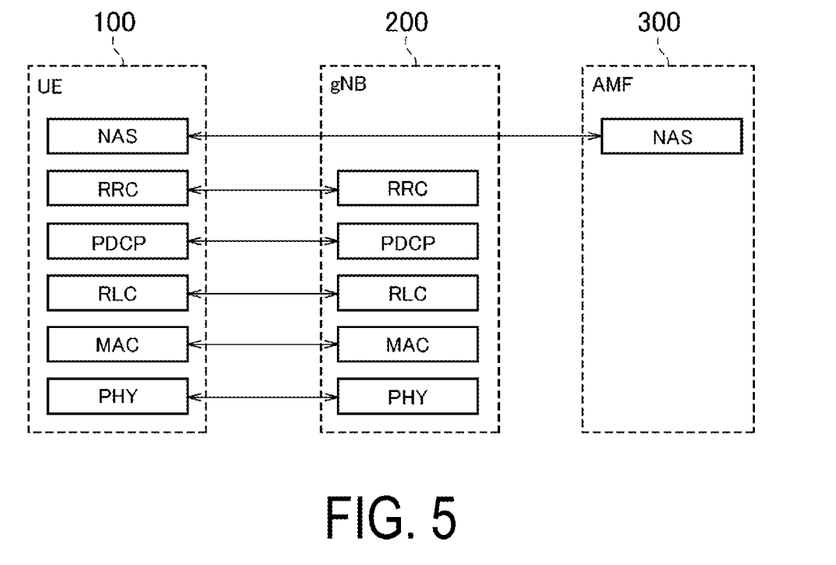
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is connection (RRC connection) between the RRC of the UE 100 and the RRC of the gNB 200, the UE 100 is in an RRC connected state. In a case where there is no connection (RRC connection) between the RRC of the UE 100 and the RRC of the gNB 200, the UE 100 is in an RRC idle state. In a case where the RRC connection is suspended, the UE 100 is in an RRC inactive state.

The NAS layer located upper than the RRC layer performs session management, mobility management, and the like. NAS signaling is transmitted between the NAS layer of the UE 100 and the NAS layer of the AMF 300.

Note that the UE 100 includes an application layer or the like, in addition to the radio interface protocol.

MDT Function

Now, an overview of an MDT function will be described. A mobile communication system according to an embodiment supports the MDT function.

In the MDT, the gNB 200 transmits, to the UE 100, a configuration message for configuring MDT measurement. Then, the gNB 200 collects MDT measurement information from the UE 100. For example, the gNB 200 is directly or indirectly connected to a server for the MDT. The server for the MDT acquires the MDT measurement information from the gNB 200 and performs network optimization including coverage optimization, based on the MDT measurement information.

The MDT includes two types: immediate MDT and logged MDT.

In the immediate MDT, the UE 100 in the RRC connected state performs radio measurement and transmits a measurement report including a measurement result and the UE position information to the network (gNB 200). The configuration message for configuring the immediate MDT may be a measurement configuration message including an information element requesting inclusion of the UE position information in the measurement report.

On the other hand, in the logged MDT, the UE 100 in an RRC idle state, an RRC inactive state, or an RRC connected state performs radio measurement, and records measurement results along with UE position information and a timestamp, and transmits log information recorded (measurement log) in response to a request from the network (gNB 200).

Coverage Enhancement Function

Now, an overview of the coverage enhancement function will be described. A mobile communication system according to an embodiment supports the coverage enhancement function.

For the UE 100 intended for the MTC and IoT service, a transmission and/or reception bandwidth is limited to only a part of the system transmission and/or reception band. For example, in LTE, such categories of the UE 100 are referred to as a category M1 and a category Narrow Band (NB)-IoT. The category M1 is the category to which an enhanced Machine Type Communications (eMTC) UE belongs. The category NB-IoT (category NB1) is the category to which an NB-IoT UE belongs.

In the category M1, the transmission and/or reception bandwidth of the UE 100 (eMTC UE) is limited to 1.08 MHz (i.e., the bandwidth of the six resource blocks). In the category NB-IoT (category NB1), the transmission and/or reception bandwidth of the UE 100 (NB-IoT UE) is further limited to 180 kHz (i.e., the bandwidth of one resource block). Such band narrowing leads to reduced cost and reduced power consumption required for the eMTC UE and the NB-IoT UE.

Figure 6:
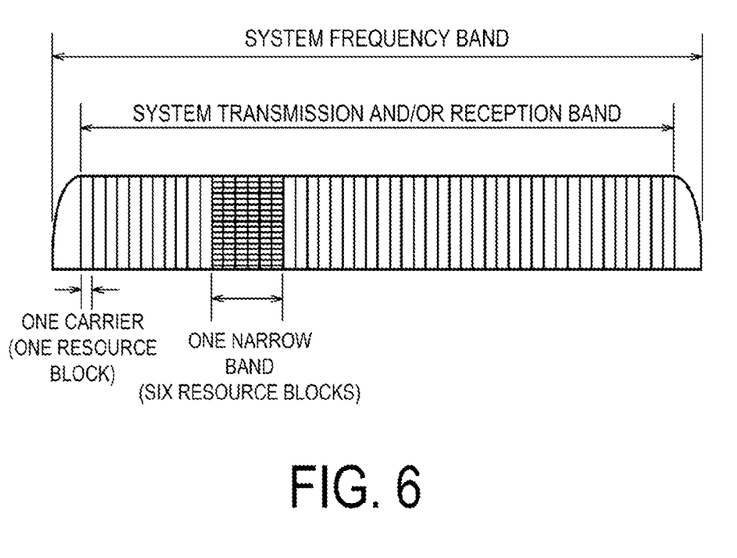
FIG. 6 is a diagram illustrating a frequency channel handled by an eMTC UE and an NB-IoT UE.

FIG. 6 illustrates frequency channels handled by the eMTC UE and the NB-IoT UE.

As illustrated in FIG. 6, the frequency bandwidth of the system frequency band of the mobile communication system may be 10 MHz. The bandwidth of the system transmission and/or reception bandwidth is, for example, 50 resource blocks=9 MHz. The bandwidth of the frequency channel that can be supported by the eMTC UE is six resource blocks or less=1.08 MHz or less.

The frequency channel of 6 resource blocks or less that can be supported by the eMTC UE is referred to as a "narrow band (NB)". The bandwidth of the frequency channel that can be supported by the NB-IoT UE is one resource block=180 kHz. The frequency channel of one resource block that can be supported by the NB-IoT UE is referred to as a "carrier".

The eMTC UE is operated within an LTE transmission and/or reception bandwidth. The NB-IoT UE supports a form in which the UE is operated within the LTE transmission and/or reception bandwidth, a form in which the UE is operated in a guard band outside the LTE transmission and/or reception bandwidth, and a form in which the UE is operated within a frequency band dedicated to the NB-IoT.

The eMTC UE and the NB-IoT UE support an enhanced coverage (EC) function using repetition transmission and the like in order to achieve coverage enhancement. Note that the enhanced coverage may be referred to as Coverage Enhancement (CE).

The coverage enhancement function may include repetition transmission (repetition) in which an identical signal is repeatedly transmitted using a plurality of subframes. A larger number of repetition transmissions more significantly enhances the coverage.

The coverage enhancement function may include power boosting that increases the power density of a transmission signal. As an example, the power density is increased by narrowband transmission that narrows the frequency bandwidth of the transmission signal. An increased power density of the transmission signal allows the coverage to be more significantly enhanced. The coverage enhancement function may include lower MCS transmission that reduces the level of the MCS used for the transmission signal. The coverage can be enhanced by performing transmission by using an MCS with a low data rate and high error resistance.

In a case where first cell selection criteria (first S-criteria) for normal coverage is not satisfied and second cell selection criteria (second S-criteria) for enhanced coverage is satisfied, the UE 100 in the RRC idle state or the RRC inactive state may determine that the UE 100 exists in an enhanced coverage. "UE existing in an enhanced coverage" may mean the UE that needs to use the coverage enhancement function (enhanced coverage state) to access a cell.

The coverage enhancement function includes a plurality of coverage enhancement levels with different degrees of coverage enhancement. For example, the UE 100 measures Reference Signal Received Power (RSRP) and compares the measured RSRP with an RSRP threshold value for each coverage enhancement level to determine the coverage enhancement level of the UE 100. The coverage enhancement level is associated with the number of transmissions in the repetition transmission (i.e., the number of repetitions).

Note that the UE existing in the enhanced coverage may perform cell re-selection by using ranking, based on a reception level (RSRP) in the RRC idle state or the RRC inactive state. For example, the UE calculates the ranking Rs of the current serving cell and the ranking Rn of a neighboring cell, and selects, as a new serving cell, a cell having a ranking Rn higher than Rs over a predetermined period of time (TreselectionRAT).

Operation According to Embodiment

Now, operations of a mobile communication system according to an embodiment will be described.

(1) Operation Scenario

Figure 7:
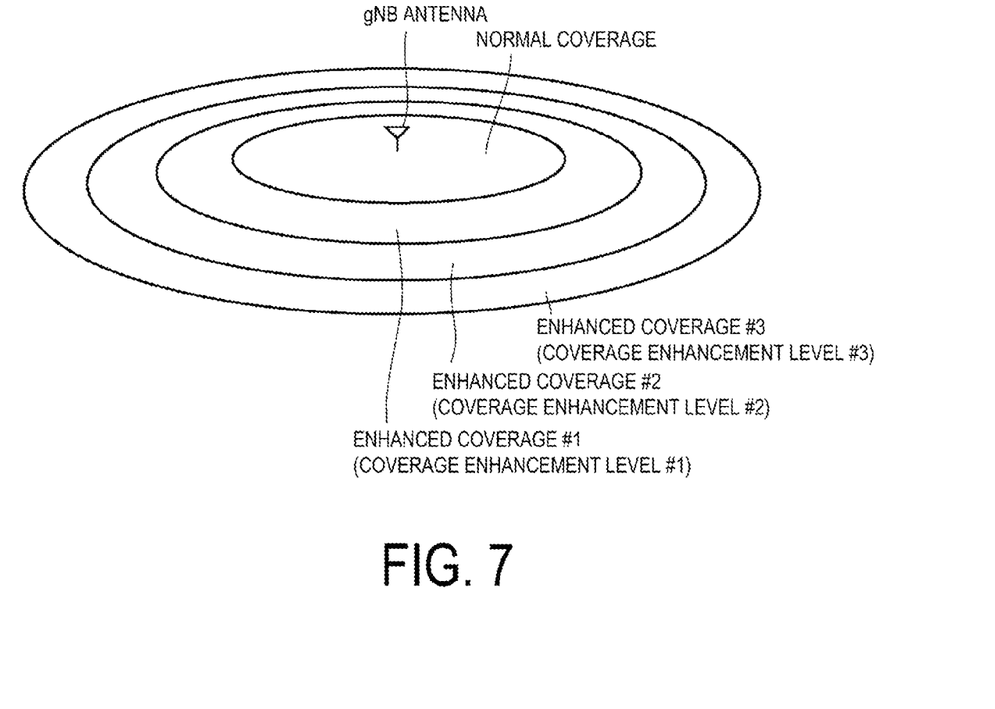
FIG. 7 is a diagram illustrating an operation scenario of a mobile communication system according to an embodiment.

FIG. 7 is a diagram illustrating an operation scenario of a mobile communication system according to an embodiment.

As illustrated in FIG. 7, in addition to a normal coverage, different enhanced coverages are formed for the respective coverage enhancement levels. The normal coverage is a region where a common UE 100 can communicate wirelessly with the gNB 200, rather than a coverage enhanced by coverage enhancement. Note that the UE 100 intended for the MTC and IoT services can also communicate wirelessly with the gNB 200 within the normal coverage.

On the other hand, the enhanced coverage is a coverage that results from coverage enhancement and in which the common UE 100 fails to communicate wirelessly with the gNB 200. The UE 100 intended for the MTC and IoT services can communicate wirelessly with the gNB 200 within the enhanced coverage.

In FIG. 7, a total of three enhanced coverages #1 to #3 are illustrated as a plurality of enhanced coverages corresponding to a plurality of coverage enhancement levels. Enhanced coverage #1 is an annular area located outside the normal coverage. Enhanced coverage #2 is an annular area located outside enhanced coverage #1. Enhanced coverage #3 is an annular area located outside enhanced coverage #2.

(2) Operation Flow

Figure 8:
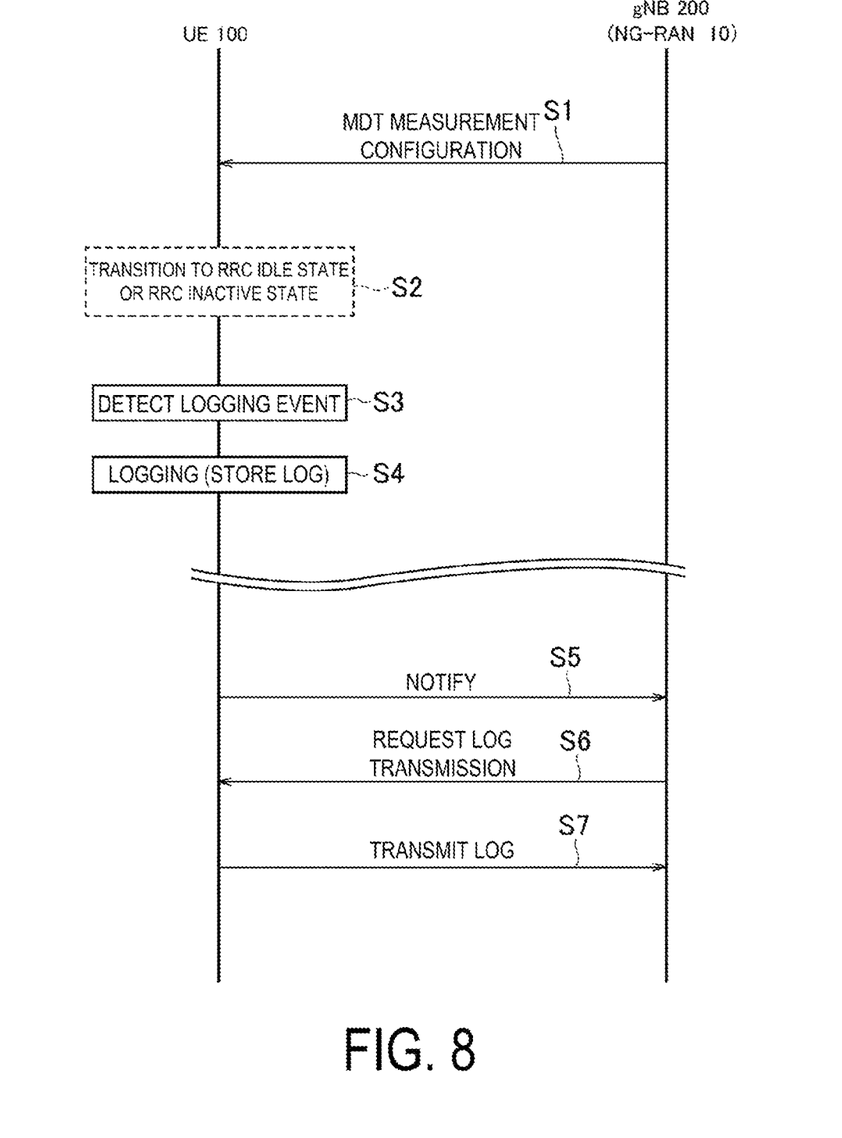
FIG. 8 is a diagram illustrating an operation flow for a mobile communication system according to an embodiment.

FIG. 8 is a diagram illustrating an operation flow of a mobile communication system according to an embodiment. Operations according to an embodiment are to implement a logged MDT in the operation scenario as illustrated in FIG. 7. The UE 100 is the UE 100 intended for the MTC and IoT services and is assumed to be located in the enhanced coverage.

Step S1: MDT Measurement Configuration

The gNB 200 transmits, to the UE 100 in the RRC connected state, an MDT measurement configuration message for configuring the logged MDT. The UE 100 receives the MDT measurement configuration message and stores various configuration parameters included in the MDT configuration message received.

The MDT configuration parameters include a logging event, a logging period, and/or a network absolute time. Here, "logging" refers to a series of operations for measuring a radio environment and storing measurement results, and "logging event" refers to an event on which logging is to be performed.

As a logging event, periodic logging is configured or an event related to the coverage enhancement function is configured. In a case where the periodic logging is configured, a logging period is specified. In a case where an event related to the coverage enhancement function is configured, for example, an event is specified that includes switching of the enhanced coverage.

The logging period refers to a period during which logging is to be performed, and a period of time from execution of the MDT measurement configuration until the end of the MDT measurement is specified.

The network absolute time refers to a time used as a reference for a timestamp added to the measurement results for the radio environment.

Step S2: Transition to the RRC Idle State or RRC Inactive State

After the end of the communication with the gNB 200, the UE 100 transitions from the RRC connected state to the RRC idle state or the RRC inactive state, and initiates a logged MDT operation in accordance with the MDT configuration parameters.

Alternatively, the UE 100 may perform, in the RRC connected state, the logged MDT operation in accordance with the MDT configuration parameters.

Step S3: Trigger Logging (Detect Logging Event)

After initiating the logged MDT operation, the UE 100 detects the logging event and determines to perform logging. In one embodiment, the UE 100 detects an event indicating that the coverage in which the UE 100 is located has switched from a first enhanced coverage to a second enhanced coverage that is different in coverage enhancement level from the first enhanced coverage.

In this regard, in a case where the coverage in which the UE 100 is currently located is an enhanced coverage, the UE 100 detects switching of the coverage enhancement level and determines to perform logging. For example, the UE 100 detects switching of the coverage enhancement level in response to moving from enhanced coverage #1 to enhanced coverage #2 as illustrated in FIG. 7. Note that the UE 100 can find out the current coverage enhancement level by comparing the received power (RSRP) of the reference signal received from the gNB 200 with a threshold value for each coverage enhancement level.

Alternatively, the UE 100 may detect that the number of repetition transmissions (the number of repetitions) exceeds or falls below the threshold value, and may determine to perform logging. In this regard, the number of repetition transmissions may be the number of downlink repetition transmissions (i.e., the number of repetition transmissions for the gNB 200) or the number of uplink repetition transmissions (i.e., the number of repetition transmissions for the UE 100).

The number of repetition transmissions may be the maximum number of repetition transmissions, or may be the number of repetition transmissions actually required for uplink transmission or downlink transmission. The maximum number of repetition transmissions may be set for each coverage enhancement level for the gNB 200 to the UE 100. The UE 100 can find out the number of repetition transmissions actually required for uplink transmission, for example, based on the timing at which the UE 100 receives the ACK from the gNB 200. The UE 100 can find out the number of repetition transmissions actually required for downlink transmission, based on the timing at which the UE 100 successfully decodes identical signals repeatedly received from the gNB 200, by synthesizing the signals.

Note that, in a case where periodic logging is configured, the UE 100 may detect that a timing based on a specified logging period has been reached and determine to perform logging.

Step S4: Logging Processing (Log Storing)

The UE 100 stores a measurement log at the time of detection of a logging event. Specifically, the UE 100 measures the radio environment for a serving cell (and neighboring cells) in response to occurrence of an event corresponding to a logging event. The measured radio environment includes, for example, reference signal received power (RSRP) and reference signal received quality (RSRQ). The measurement information regarding the radio environment may include the identifier of a narrow band (NB, six resource blocks) subjected to the measurement. The measurement information regarding the radio environment may include the identifier of a carrier (one resource block) subjected to the measurement.

The UE 100 stores the measurement information regarding the radio environment along with the position information and the timestamp. A combination of the measurement information regarding the radio environment, the position information, and the time stamp is referred to as a measurement log. Note that the position information may be GNSS position information in a case where the UE 100 includes a GNSS receiver. In a case where the UE 100 includes no GNSS receiver, the position information may be an RF fingerprint.

In one embodiment, the UE 100 stores the measurement log in association with information regarding the enhanced coverage in which the UE 100 is located (hereinafter referred to as "CE-related information"). The UE 100 may associate one piece of CE-related information with one measurement log or with a plurality of measurement logs. In other words, the UE 100 may include the CE-related information in each measurement log or in a measurement log group including a plurality of measurement logs.

Here, the CE-related information includes at least one of the pieces of information in 1) to 4) described below.

1) Identifier of Coverage Enhancement Level:

The UE 100 includes, in the CE-related information, the identifier of the coverage enhancement level (coverage enhancement level number) of the enhanced coverage in which the UE 100 is located when the measurement log is stored.

2) The Number of Repetition Transmissions Actually Required for Uplink Transmission or Downlink Transmission:

The UE 100 includes, in the CE-related information, the number of repetition transmissions actually required for uplink transmission or downlink transmission. In this regard, the uplink transmission is not limited to transmission of uplink data, and may be transmission of a random access preamble (PRACH transmission) in a random access procedure. The downlink transmission is not limited to transmission of downlink data, and may be transmission of downlink control information (e.g., M-PDCCH).

3) Information Regarding Combined Power During Downlink Repetition Reception:

The UE 100 includes, in the CE-related information, the combined power during a plurality of (N) downlink repetition transmissions. Specifically, the UE 100 measures or calculates the combined power obtained when identical signals repeatedly received from the gNB 200 by the UE 100 are synthesized, and includes the combined power in the CE-related information. At this time, the UE 100 may calculate the combined power by considering that the signals for the maximum number of repetition transmissions corresponding to the coverage enhancement level have been received (performing addition N times). The UE 100 may include, in the CE-related information, the number of receptions (N) from the gNB 200.

4) Information Regarding Uplink Transmission Power:

The UE 100 includes, in the CE-related information, the information regarding the transmit power in the enhanced coverage. In this regard, the transmit power may be the average transmit power for a single uplink transmission, or may be combined transmit power during a plurality of (N) uplink transmissions. At this time, the UE 100 may include, in the CE-related information, information indicating whether the transmit power is a value for a single (average) transmission or combined power during N transmissions.

Step S5: Notify of Availability of Measurement Log

In a case of transitioning from the RRC idle state or the RRC inactive state to the RRC connected state, in a case of performing handover, or the like, the UE 100 transmits, to the gNB 200, a notification message indicating that the UE 100 has a measurement log. The notification message may be referred to as an availability indicator.

Note that the gNB 200 for managing the cell in which the UE 100 exists during the MDT measurement configuration (step S1) may differ from the gNB 200 for managing the cell in which the UE 100 exists during the notification (step S5).

In one embodiment, the UE 100 transmits, to the gNB 200, a notification message including information indicating the presence of a measurement log stored in the enhanced coverage. For example, the UE 100 includes, in the notification message, an identifier indicating that the type of the measurement log in the UE 100 corresponds to the measurement log stored in the enhanced coverage.

The UE 100 may transmit the notification message in the normal coverage instead of transmitting the notification message in the enhanced coverage. In other words, the UE 100 transmits the notification message only when the UE 100 is located in the normal coverage. The uplink transmission in the enhanced coverage leads to an increased load due to repetition transmissions, and thus the notification message may be transmitted after the UE 100 moves into the normal coverage.

Alternatively, the UE 100 may also transmit the notification message in the enhanced coverage.

Note that whether the notification message is transmitted only in the normal coverage may be configured in advance for the UE 100 by the gNB 200. The configuration may be made by an RRC Release message by which the gNB 200 causes the UE 100 to transition to the RRC idle state or RRC inactive state. For this configuration, for example, the gNB 200 needs to find out whether the UE 100 is to move (in other words, whether the UE 100 has a possibility of returning to the normal coverage). Thus, the gNB 200 may determine the configuration based on movement state information previously notified from the UE 100 (e.g., information indicating that the UE 100 is fixed/immobile, a UE movement speed, and/or history information regarding cells re-selected by the UE 100 during a certain period of time).

Step S6: Request Transmission of the Measurement Log

Based on the notification message from the UE 100, the gNB 200 requests the UE 100 to transmit (report) the message including the measurement log.

In response to reception of the notification message from the UE 100 located in the enhanced coverage, the gNB 200 may request the UE 100 to transmit (report) the message including the measurement log after the UE 100 moves into the normal coverage.

Note that the log held in the logged MDT is discarded when a certain period of time has elapsed (i.e., deletion of a log file or deletion of data from the memory). The certain period is, for example, 48 hours. In a case where the measurement log is not transmitted in the enhanced coverage, the UE 100 is more likely to discard the log held, and this is not preferable in terms of power consumption of the UE 100 and a data collection rate in the network. Thus, in a case of being that the UE 100 exists in the enhanced coverage, the UE 100 may perform processing for stopping the timer that measures the certain period of time. In a case of being determined that the UE 100 exists in the normal coverage, the UE 100 may restart the timer that measures the certain period of time. The stopping and restarting processing of the timer as described above may respectively be performed in a case where the notification message is not transmitted due to the location in the enhanced coverage and in a case where the notification message is transmitted due to the location in the normal coverage.

Step S7: Transmit Measurement Log

In response to a transmission request from the gNB 200, the UE 100 transmits, to the gNB 200, the message including the measurement log. Thus, the gNB 200 acquires the measurement log from the UE 100.

Summary of Embodiments

As described above, the UE 100 performs logging by using, as a trigger, an event indicating that the coverage in which the UE 100 is located switches from the first enhanced coverage to the second enhanced coverage differing in coverage enhancement level from the first enhanced coverage. Thus, the location of the boundary of the enhanced coverage is stored as a measurement log, and the network can acquire the measurement log. Accordingly, the network can find out the location of the boundary of the enhanced coverage and adjust network configurations to optimize the location of the boundary of the enhanced coverage. By performing logging only in response to switching of the enhanced coverage, a possible increase in the processing load and power consumption of the UE 100 can be suppressed.

The UE 100 stores the measurement log in association with the CE-related information. This allows the network to acquire information specific to the enhanced coverage and thus to optimize network configurations related to the enhanced coverage.

Furthermore, the UE 100 transmits, to the gNB 200, the notification message including the information indicating the presence of the measurement log stored in the enhanced coverage. This allows the gNB 200 to find out the type of the measurement log in the UE 100 to then determine whether to request the UE 100 to transmit the measurement log.

Other Embodiments

In the embodiments described above, an example in which the logged MDT is applied as the MDT has been primarily described, but the immediate MDT may be applied.

In the embodiments described above, the 5G system (NR) has primarily been described. However, the operations according to the embodiments may be applied to LTE.

Note that a program may be provided that causes a computer to execute each of processing performed by the UE 100 or the gNB 200. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processing operations performed by the UE 100 or the gNB 200 may be integrated to configure at least a portion of the UE 100 or the gNB 200 as a semiconductor integrated circuit (chip set, SoC).

An embodiment has been described above in detail with reference to the drawings; however, specific configurations are not limited to those described above, and various design modifications can be made without departing from the gist of the present disclosure.

The invention claimed is:

1. A method comprising:
comparing, by a user equipment, a radio quality of a cell with a threshold value for each level of a CE (Coverage Enhancement);
determining, by the user equipment, a level of a CE in which the user equipment is located based on the compared result;
transmitting, by the user equipment, a notification message for indicating that there is report information related to the CE, in response to transitioning from a RRC idle state or a RRC inactive state to a RRC connected state or in response to performing handover;
receiving, from the cell, a request for reporting the report information related to the CE based on the notification message; and
reporting, by the user equipment to the cell, the report information including information identifying the determined level of the CE in response to the request, wherein
the report information further includes information of transmission power of uplink in the CE in which the user equipment is located.

2. A user equipment comprising:
a transmitter;
a receiver; and
a controller configured to:
compare a radio quality of a cell with a threshold value for each level of coverage enhancement (Coverage Enhancement);
determine a level of a CE in which the user equipment is located based on the compared result;
control the transmitter to transmit a notification message for indicating that there is report information related to the CE, in response to transitioning from a RRC idle state or a RRC inactive state to a RRC connected state or in response to performing handover;
control the receiver to receive, from the cell, a request for reporting the report information related to the CE based on the notification message; and
control the transmitter to report, to the cell, the report information including information identifying the determined level of the CE in response to the request, wherein
the report information further includes information of transmission power of uplink in the CE in which the user equipment is located.

3. A chipset for controlling a user equipment, the chipset comprising: a processor and a memory coupled to the processor, the processor configured to execute processes of:
comparing a radio quality of a cell with a threshold value for each level of a CE (Coverage Enhancement);
determining a level of a CE in which the user equipment is located based on the compared result;
transmitting a notification message for indicating that there is report information related to the CE, in response to transitioning from a RRC idle state or a RRC inactive state to a RRC connected state or in response to performing handover;
receiving, from the cell, a request for reporting the report information related to the CE based on the notification message; and
reporting, to the cell, the report information including information identifying the determined level of the CE in response to the request, wherein
the report information further includes information of transmission power of uplink in the CE in which the user equipment is located.

* * * * *